Nov. 16, 1965 J. C. OWEN ETAL 3,217,539

TURBINE FLOW METER

Filed April 7, 1961

INVENTORS
JOHN C. OWEN
BY DONALD R. DeMAAGD

David Young
ATTORNEY

United States Patent Office 3,217,539
Patented Nov. 16, 1965

3,217,539
TURBINE FLOW METER
John C. Owen, Grand Rapids, and Donald R. De Maagd, Grandville, Mich., assignors to PneumoDynamics Corporation, Cleveland, Ohio, a corporation of Delaware
Filed Apr. 7, 1961, Ser. No. 101,462
1 Claim. (Cl. 73—231)

The instant invention relates to flow meters for measuring the rates of flow of fluid through a line, and more particularly to a flow meter having a meter element driven by the flow of fluid and means adapted to produce signals in response to operation of the meter element at rates proportional to the rates of flow of the fluid through the line for measuring the rates of flow by the signals produced.

It is an object of the instant invention to provide an improved flow meter for measuring rates of flow of fluid through a line.

It is a further object of the instant invention to provide an improved flow meter adapted to produce signals at rates proportional to the rates of flow of fluid, for measuring the rates of flow of the fluid by said signals.

It is another object of the instant invention to provide an improved flow meter having a meter element driven by the flow of fluid, for the production of signals at rates proportional to the rates of flow of the fluid, for measuring the rates of flow of the fluid by the signals so produced.

It is also an object of the instant invention to provide an improved flow meter having a meter element disposed in the stream of fluid to be driven by the flow thereof, and a sensing element disposed outside of the stream of fluid to generate signals in response to the operation of the meter element at rates proportional to the rates of flow of the fluid, for measuring the rates of flow of the fluid by the signals so produced.

Still a further object of the instant invention is to provide an improved flow meter having a meter element comprising light reflective portions and alternately disposed non-light reflective portions, for the production of signals by the reflection of light from the light reflective portions at rates proportional to the rates of flow of the fluid, to measure the rates of flow of the fluid by the signals so produced.

Still another object of the instant invention is to provide an improved flow meter having a meter element comprising a rotor formed with radially extending blades by which the rotor is rotated by the flow of fluid, the blade tips being light reflective and other portions of the rotor being non-light reflective, for reflection of light from the light reflective blade tips, and including means for sensing the reflections of light from the blade tips for the production of signals proportional to the rates of flow of the fluid to measure the rates of flow of the fluid by the signals so produced.

Still another object of the instant invention is to provide an improved flow meter having a meter element comprising a rotor adapted to be rotated by the flow of fluid, and comprising circumferentially spaced light reflective portions adapted to successively pass a sensing position at which reflections of light from said light reflective portions are sensed for the production of signals at rates proportional to the rates of flow of the fluid, for measuring the rates of flow of the fluid by the signals so produced.

Other objects and advantages of the invention will appear hereinafter from the description thereof which follows.

Figure 1:
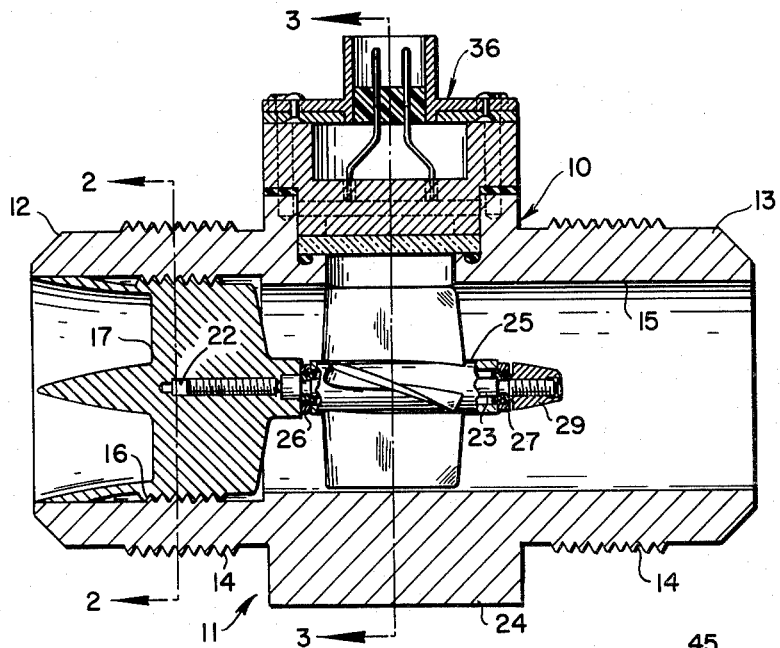
FIG. 1 is a longitudinal sectional view of a flow meter constructed in accordance with the instant invention.
Figure 2:
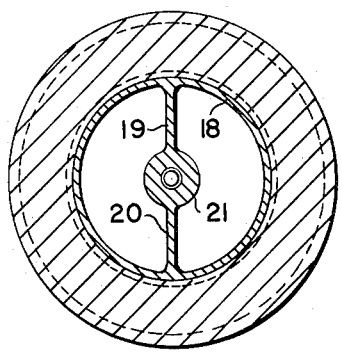
FIG. 2 is a sectional view of the flow meter taken on the line 2—2 in FIG. 1.
Figure 3:
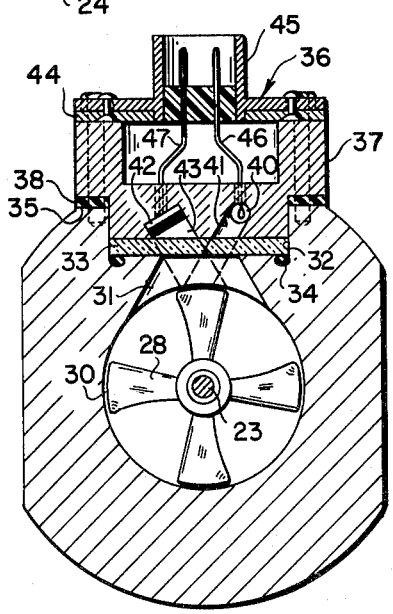
FIG. 3 is a sectional view of the flow meter taken on the line 3—3 in FIG. 1.

The flow meter 10 of the instant invention comprises a housing 11 which includes an integral upstream line connector 12 and an integral downstream line connector 13. The line connectors 12, 13 are each cylindrical and include threads 14, or the like, formed on the peripheries thereof for the connection of a line to the opposite sides of the flow meter 10. By means of the connectors 12, 13, the flow meter 10 is interposed in a line through which fluid flows, so that the fluid will flow through the flow meter 10. The line connector 12 is disposed in the upstream portion of the line, and the line connector 13 is disposed in the downstream portion of the line, so that the fluid flows through the flow meter 10 in a direction from left to right as viewed in FIG. 1.

A bore 15 extends in an axial direction through the flow meter 10 from one end to the other end thereof. The portion of the bore 15 disposed within the upstream line connector 12 is formed with threads 16. Support structure in the form of a flow straightener 17 is disposed within the upstream line connector 12, and is formed with an annulus 18 that is threaded on its outer periphery for engagement with the threads 16 to secure the flow straightener 17 within the upstream line connector 12. the flow straightener 17 is formed with a generally streamline configuration, as best seen in FIG. 1, so as not to impede the flow of fluid as it enters the flow meter 10. A pair of opposite, radially disposed vanes 19, 20 extend inwardly from the annulus 18 along a diametric line and support a hub 21 which is disposed on the axis of the bore 15 and on the axis of the annulus 18, the latter being coincident with the axis of the bore 15. The vanes 19, 20 serve to reduce turbulence in the stream of fluid and thereby have the effect of straightening the flow of fluid entering the flow meter 10.

The hub 21 of the flow straightener 17 is formed with a threaded recess or bore 22 that is disposed on the axis of the bore 15 and opens in a downstream direction. A fixed non-rotating cantilever shaft 23 is threadedly secured in the bore 22, and extends in a downstream direction from the flow straightener 17 into the centrally disposed body portion 24 of the housing 11. A meter element in the form of a rotor 25 is rotatably supported on the shaft 23 by a pair of bearings 26, 27 disposed at opposite ends of the rotor 25, and interposed between the shaft 23 and the rotor 25. In the preferred embodiment of the invention as disclosed herein, the rotor 25 is formed with four integral blades 28, which extend radially at equidistantly spaced circumferential positions on the rotor 25. Each of the blades 28 is similarly formed with a hydrofoil configuration, whereby the flow of the fluid through the flow meter 10 acting on the blades 28 produces rotation of the rotor 25. The rotor 25 is held on the shaft 23 by a retainer nut 29 threaded on the end of the shaft 23 and abutting the bearing 27.

The tip of each blade is blunt, to provide a blade tip surface 30 having a substantial circumferentially disposed area. The rotor 25 may be formed of a material having high light reflective properties such as aluminum, and is darkened as by painting it black, and then the blade tip surfaces 30 may be polished to augment their light reflective properties, or they may be painted white, so that the blade tip surfaces 30 are highly light reflective, and the other alternately disposed portions of the rotor 25 are relatively non-light reflective, for a purpose as will appear hereinafter.

The centrally disposed body portion 24 of the flow meter 10 is formed with a port 31 that extends through to the bore 15. The port 31 is of such size relative to the spacing of the rotor blades 28, that only one blade tip surface 30 will be in view of the port 31 at a given instant. Above the port 31 there is formed a seat 32 in which there is a window 33, comprising a disk of glass, through which the blade tip surfaces 30 may be viewed as they successively pass the port 31. An annularly disposed O-ring 34 is interposed between the window 33 and the body portion 24 for preventing any leakage of fluid from the bore 15.

The centrally disposed body portion 24 has a shoulder 35 on which there is seated a sensing housing 37, which encloses a sensing assembly 36. A gasket 38 is interposed between the sensing housing 37 and the shoulder 35 and forms a dust seal for the elements of the sensing assembly 36. The sensing housing 37 is seated on the centrally disposed body portion 24 of the flow meter housing 11, and extends downwardly against the window 33 for securely holding the latter in place against the O-ring 34, for maintaining the fluid tight seal. The sensing assembly 36 may be secured to the body portion 24 by a plurality of screws extending through the sensing housing 37 and threaded into the body portion 24.

A miniature light 40 is mounted in the sensing housing 37 and directs a beam of light through a port 41, which is formed in the sensing housing 37, and through the window 33 and the port 31 to illuminate the blade tip surfaces 30 as they successively pass the window 33. At the opposite side of the sensing housing 37 there is mounted a light responsive element 42, which may be a silicon photo cell, that is capable of producing current in response to light shining on the element. The light responsive element 42 is mounted behind a port 43 in the sensing housing 37. The ports 41 and 43 converge toward each other and register with the port 31 in the body portion 24 of the housing 11 so that the light reflected from the blade tip surfaces 30 is directed to the light responsive element 42 through the port 31, the glass window 33 and the port 43 to shine on the light responsive element 42.

The sensing housing 37 is closed by a cover 44, and a four pronged electrical connector 45 is secured to the cover 44. A pair of electrical leads 46 extend from the connector 45 to the miniature light 40 for supplying current to the latter. A second pair of electrical leads 47 extend from the light responsive element 42 to the connector 45 for conducting the current produced by the light responsive element 42. External electrical leads can then be connected to the four prong connector 45 externally of the sensing assembly 36 in the usual manner.

The rotor 25 is freely rotatably mounted on the shaft 23, and as the fluid flows through the bore 15 of the flow meter 10, the flow of the fluid past the rotor blades 28 produces rotation of the rotor 25 at rates of speed which are proportional to the rates of flow of the fluid through the flow meter 10. By rotation of the rotor 25 the blade tip surfaces 30 are successively passed in front of the window 33, and light will be reflected from the successive blade tip surfaces 30 onto the light responsive element 42. The light reflected onto the light responsive element 42 will increase and then decrease as the blade tip surfaces 30 pass into and out of view of the window 33. Accordingly, the current generated by the light responsive element 42 will correspondingly increase and decrease and will thereby produce a pulsating current signal, the frequency of which will be proportional to the rate of rotation of the rotor 25, which in turn is proportional to the rate of flow of the fluid through the flow meter 10. The pulsating current signals produced by the light responsive element 42 may be fed into suitable electrical measuring equipment, which is calibrated to show rates of flow of fluid, for example as gallons per minute, and thereby serve to measure the rate of flow of the fluid through the flow meter 10.

By the instant invention there is provided a flow meter which comprises a few simple elements that form a compact device that may be readily connected in a line for measuring rates of flow of fluid through that line. The rotor, which is the metering element of the flow meter, is not subject to fouling and is capable of providing highly dependable performance. The sensing element, by which there are produced the signals for the measuring of the rates of flow of the fluid, is mounted in a sensing housing in which it is protected from damage by the fluid flowing through the flow meter. The metering element and the sensing element are in effect separately housed in the flow meter, which permits access to either without disturbing the other and also facilitates assembly.

It will be apparent that those skilled in the art may make various changes in the details and arrangements of the parts of the invention without departing from the spirit and scope of the invention as defined by the claim hereto appended, and therefore it is desired that the scope of the invention not be restricted to the precise construction herein disclosed.

Having thus described and shown an embodiment of the invention, what it is desired to secure by Letters Patent of the United States is:

A flow meter for measuring rates of fluid flow which may be passing in a stream;

said flow meter comprising, in combination an elongate housing having line connectors adjacent each end portion thereof and a bore extending generally longitudinally therethrough;

said bore having a susbtantially constant cross-sectional area throughout the full longitudinal extent thereof through which such fluid flow may pass from an upstream to a downstream location;

a rotor having a plurality of circumferentially spaced apart generally radially outwardly projecting blades each of which terminates in a tip surface having higher light reflecting properties than the remaining portion thereof;

support structure for rotatably supporting the rotor within the confines of the bore in the housing with the axis of rotation of the rotor being substantially parallel to such fluid flow therethrough and with the rotor being responsive to such fluid flow to rotate at speeds proportional thereto;

said support structure comprising a hub portion disposed substantially along the longitudinal axis of the bore in the housing, said hub portion having a pair of diametrically opposed vanes projecting generally radially outwardly therefrom and terminating in an endless annular portion, said annular portion being externally threaded for engagement with an internally threaded portion of the housing, said hub portion further being provided with an internally threaded recess disposed along the longitudinal axis of the bore in the housing, and said rotor being provided with an elongate non-rotating shaft disposed in threaded engagement with the internally threaded recess of the hub portion of the support structure;

said housing having a port therethrough at a location therealong which is intermediate the end portions thereof with said port being disposed in lateral alignment with the tip surfaces of the blades of the rotor, said port of the housing having an area which enables only a single one of the tip surfaces of the blades of the rotor to register therewith during the rotation thereof;

a sensing assembly carried by the housing at the location of the port, said sensing assembly having porting with registers with the port in the housing;

a light source in the porting of said sensing assembly for successively directly illuminating a single blade tip surface of the rotor one at a time as the blade tip surfaces thereof pass by the port in the housing; and a light responsive element in the porting of the sensing device for sensing the reflections of each of the successively illuminated blade tip surfaces as they pass one at a time by the port in the housing to enable the rate of such fluid flow through the bore in the housing to be measured.

References Cited by the Examiner

UNITED STATES PATENTS

| | | | |
|---|---|---|---|
| 3,021,710 | 2/1962 | Barrere et al. | 73—229 |
| 3,053,087 | 9/1962 | Waugh | 73—231 |

FOREIGN PATENTS

| | | |
|---|---|---|
| 514,153 | 11/1939 | Great Britain. |
| 1,164,587 | 5/1958 | France. |

RICHARD C. QUEISSER, *Primary Examiner.*

ROBERT L. EVANS, JOSEPH P. STRIZAK, *Examiners.*